United States Patent [19]
Ehrenberg

[11] 4,089,384
[45] May 16, 1978

[54] SELF-PROPELLED LAND VEHICLE

[76] Inventor: Gustave Ehrenberg, 133 Golf Hills Rd., Havertown, Pa. 19083

[21] Appl. No.: 764,370

[22] Filed: Jan. 31, 1977

[51] Int. Cl.² .............................................. B60K 17/30
[52] U.S. Cl. ................... 180/44 E; 180/65 E; 280/96.1; 280/DIG. 1
[58] Field of Search ................. 180/44 E, 44 R, 65 E, 180/65 F; 280/96.1, 660, 662, 664, 666, 668, 670, 673, 675, 722, DIG. 1; 267/59

[56] References Cited

U.S. PATENT DOCUMENTS

| 1,373,331 | 3/1921 | Hupp | 267/59 |
|---|---|---|---|
| 2,608,260 | 8/1952 | Johnson | 180/44 R |
| 3,049,359 | 8/1962 | Geyer | 280/DIG. 1 |
| 3,061,024 | 4/1962 | Ulinski | 180/6.5 |
| 3,082,017 | 3/1963 | Moore | 280/666 |
| 3,689,101 | 9/1972 | Spence | 280/664 |
| 3,786,889 | 1/1974 | Kelley | 180/44 E |
| 3,955,639 | 5/1976 | Cragg | 180/65 F |

Primary Examiner—Joseph F. Peters, Jr.
Assistant Examiner—Donn McGiehan
Attorney, Agent, or Firm—Smith, Harding, Earley & Follmer

[57] ABSTRACT

In an automobile having an independent motor driving each wheel, the effective unsprung mass is minimized, and impulse shock is reduced, by arranging each wheel at the end of an arm pivoted about a normally horizontal axis of gravity of the motor, having a center of percussion approximately at the wheel axis, and having a corresponding axis of suspension at the arm's pivot.

16 Claims, 17 Drawing Figures

SELF-PROPELLED LAND VEHICLE

BRIEF SUMMARY OF THE INVENTION

This invention relates to self-propelled land vehicles, and particularly to an improvement in suspension systems, making practical an entirely new concept in automobile design and maintenance.

The new concept in automobile design and maintenance involves the use of a relatively simple central power plant such as a turbine-driven electric generator, and a plurality of independent motor-wheel systems, the motor of each such system being connected to receive its driving power from the central power plant. Each motor-wheel system can be rapidly removed and replaced by a new or factory-rebuilt motor-wheel system. No mechanical connection from the turbine generator to the motor-wheel systems is needed. Consequently, the turbine generator unit can be easily replaced also. This provides the owner with an automobile which can be almost completely rejuvenated. The body and frame of the vehicle are constructed from a light-weight, high-quality, corrosion resistant material such as an anodized magnesium alloy, and may be used for many years without replacement. In the event the body or frame is damaged in an accident, it is contemplated that the magnesium will be reclaimed and used to make a new vehicle.

The idea of a readily replaceable motor-wheel system is not easily implemented. As is well-known to designers of conventional wheeled vehicles, a complete vehicle comprises a spring-supported mass $m_1$, normally corresponding to the mass of the vehicle body, frame and motor, and a non-spring supported mass $m_2$, normally corresponding to the mass of the wheels, axles, differential, etc. In a system comprising a spring-supported mass $m_1$ and a non-spring supported mass $m_2$ coupled by a spring and a damper connected in parallel, the kinetic energy of an impulse imparted to $m_2$ is partially absorbed by the damper. The remaining kinetic energy in $m_2$ is converted to potential energy in the spring, and is subsequently released both to $m_1$ and $m_2$, imparting a kinetic energy $\frac{1}{2} m_1 v_1^2$ to $m_1$ and a kinetic energy $\frac{1}{2} m_2 v_2^2$ to $m_2$. The system must satisfy both the principle of conservation of energy and the principle of conservation of momentum. Applying these principles, it can be shown that the ratio of the kinetic energies of the respective masses is inversely proportional to the masses:

$$\frac{\frac{1}{2} m_1 v_1^2}{\frac{1}{2} m_2 v_2^2} = \frac{m_2}{m_2}$$

The above description is somewhat oversimplified, but it is basically the reason why it has generally been the practice to minimize the ratio $m_2/m_1$ in a vehicle suspension system.

Ordinarily the provision of an independent motor in driving relationship with each wheel on a vehicle would do either of two things. If the motor were coupled to the wheel through a rigid shaft, gearing or similar means, it would constitute a part of the non-spring supported mass $m_2$, and therefore would increase the ratio $m_2/m_1$, giving rise to an increased effect of bumps on the spring-supported mass. On the other hand, if the motor were supported on the vehicle frame and coupled to the wheel through a flexible coupling or universal joint, it would not increase the ratio $m_2/m_1$, but the wheel drive would be structurally much more complex, and would also be more difficult to service.

The primary object of this invention is to provide a practical vehicle having a plurality of independent motor-wheel systems. The mass $m_w$ of each motor-wheel system is necessarily rather large. Transfer of momentum from the motor-wheel systems to the spring-supported mass $m_v$ of the vehicle is minimized not by making $m_v >> m_w$, but by supporting each motor-wheel system from the vehicle frame about a normally horizontal pivot axis, and positioning the wheel, motor and other parts of each system so that the motor of each system is much closer to the normally horizontal pivot axis than the wheel of the system is to the pivot axis. This reduces the contribution of the motor's weight to the momentum of the motor-wheel system and consequently lowers the overall momentum transferred to the spring-supported mass of the vehicle. Preferably, the motor-wheel system is arranged so that the center of gravity of the motor approximately coincides with the pivot axis of the system. This minimizes the contribution of the motor's weight to the momentum of the motor-wheel system.

It is also desirable to position the wheel, motor and the other parts of each motor-wheel system in accordance with their respective masses in such a way that the normally horizontal pivot axis of the system is an axis of suspension corresponding to a center of percussion located substantially at the corresponding wheel axis. This relationship prevents the initial shock which occurs when the wheel hits a bump from being transferred to the vehicle frame.

Other objects of the invention will be readily apparent from the following detailed description when read in conjunction with the drawings.

DETAILED DESCRIPTION

Figure 1:
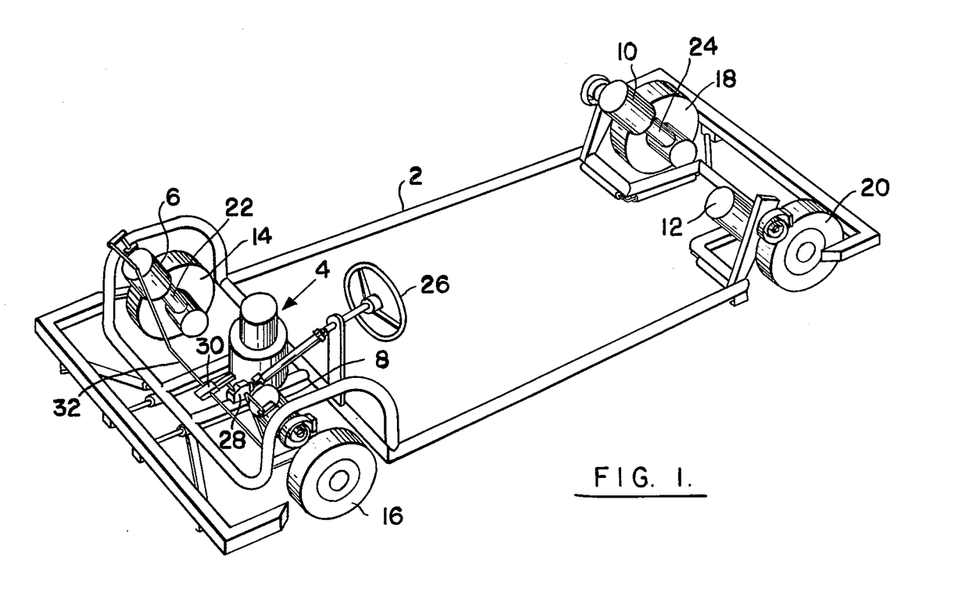
FIG. 1 is an oblique perspective of a vehicle in accordance with the invention, having four independent motor-wheel systems.

FIG. 1 shows a generally rectangular, tubular metal frame 2. A power plant, comprising a turbine-electric generator set 4, is supported on the frame. Electric motors 6, 8, 10 and 12 are provided respectively for wheels 14, 16, 18 and 20, so that each wheel has its own electric motor associated with it. Consequently, the vehicle has four independent motor-wheel systems.

In each motor-wheel system, an arm is pivotally supported on the vehicle frame, and is adapted to swing about an axis. This axis is normally horizontal for each motor-wheel system. However, in the case of a steerable motor-wheel system, the axis may deviate from its horizontal position as the vehicle is steered. The term "normally horizontal", therefore, is intended to mean "substantially horizontal while the vehicle is travelling in a straight line on a roadway which is not banked". A typical arm is indicated at 22, as part of the motor-wheel system comprising motor 6 and wheel 14. Another arm 24 forms part of the motor-wheel system comprising motor 10 and wheel 18. Similar arms (not shown in FIG. 1) constitute a part of the other motor-wheel systems on the vehicle.

In each system, the wheel is rotatably supported at an end of the arm which is remote from the normally horizontal pivot axis. The motor in each system is also supported on the arm, but at a location closer to the normally horizontal pivot axis than the axis of rotation of the wheel of the system is to the pivot axis.

Figure 4:
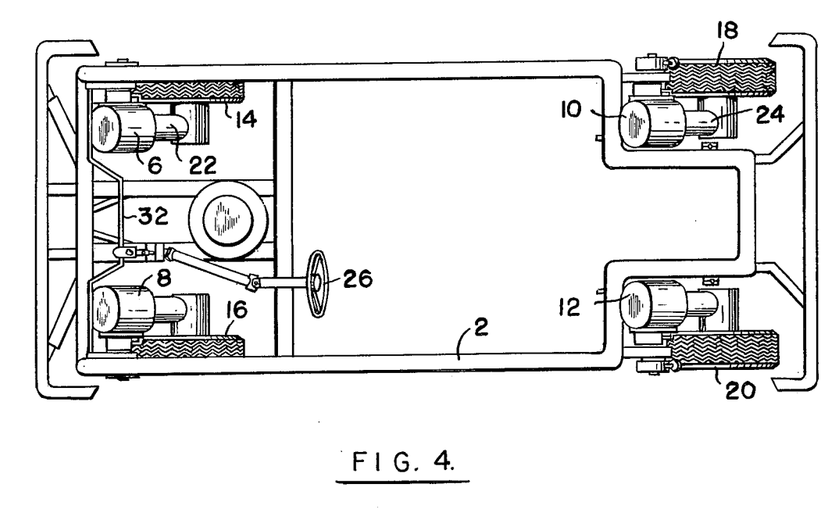
Figure 5:
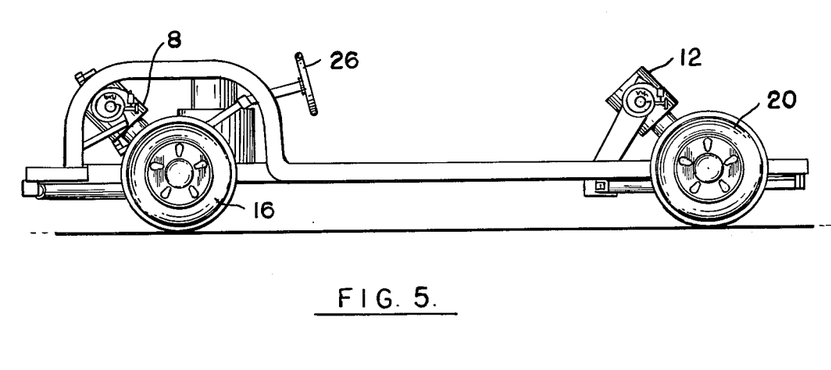

As best shown in FIGS. 4 and 5, each of the motor-wheel systems is normally maintained in a position such that its arm extends downwardly and rearwardly at an acute angle, i.e. an angle greater than zero but less than ninety degrees. This angle is measured between the roadway and a line drawn perpendicularly between the wheel axis and the normally horizontal pivot axis, and can be, for example, 45°. As will be explained in detail, each motor-wheel system is capable of swinging about its pivot axis, but is held in its acute angular position by means of a spring. As the load in the vehicle varies, the stress acting on the spring is varied, the the orientation of the motor-wheel system is accordingly changed. Orientation of the motor-wheel systems is restored by electrically-operated adjusting means, which will be described with reference to FIGS. 8 and 9.

Returning to FIG. 1, a steering wheel 26 is connected through a steering box 28 to control an arm 30. Arm 30 is connected through a tie rod 32 to the two front motor-wheel systems in order to steer these systems.

Figure 6:
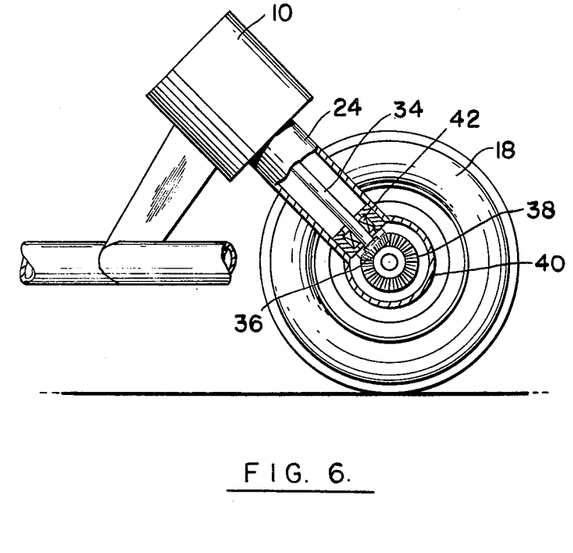
FIG. 6 is a partially cut-away side elevation of the right-rear motor-wheel system of FIG. 1, showing the right-angle gearing through which the wheel is driven.

As shown in FIG. 6, motor 10 of the right-rear motor-wheel system is connected through a shaft 34 and through a right angle gear system comprising gears 36 and 38 to the hub of wheel 18. Shaft 34 is enclosed within arm 24, and an enclosure 40 is provided for the right-angle gear system. Conventional wheel bearings support the wheel rotatably. Preferably, motor shaft 34 is supported by a pair of bearings, one such bearing being shown at 42. The other bearing (not shown) is at the upper side of the rotating part of the motor. There is no bearing at the point where shaft 34 joins the rotating part of the motor.

Figure 7:
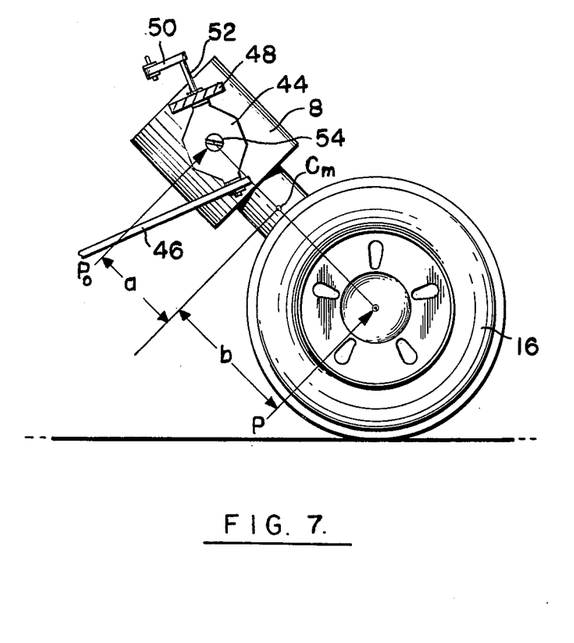
FIG. 7 is a side elevation of the left-front motor-wheel system of FIG. 1 showing a pivoted support for supporting and steering the motor-wheel system.
Figure 9:
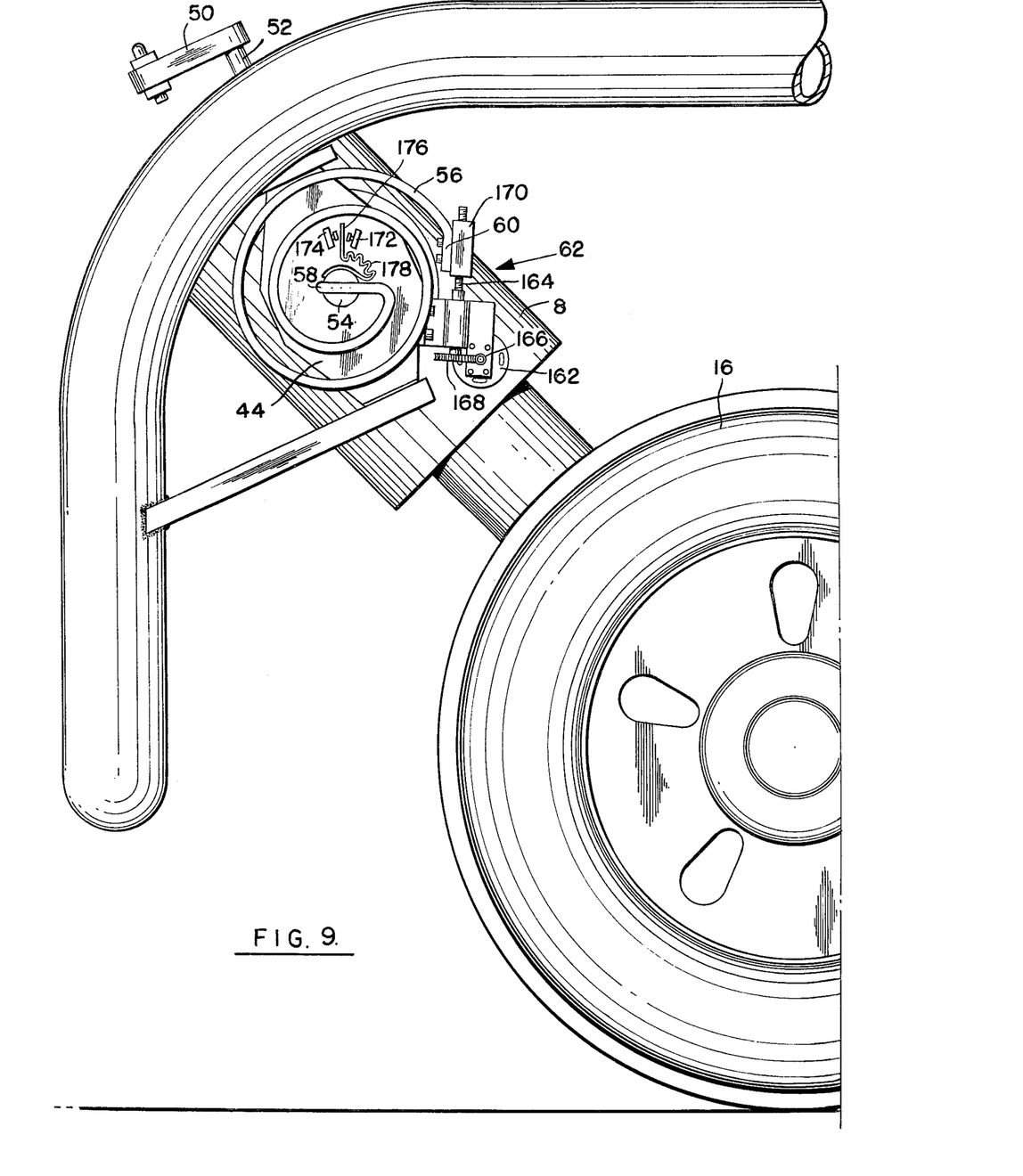
FIG. 9 is a side elevation of the front left-hand motor-wheel system of FIG. 1, showing a spring connecting the motor wheel system to the pivoted support and also showing motor-driven means for positioning the motor-wheel system in order to level the vehicle.
Figure 10:
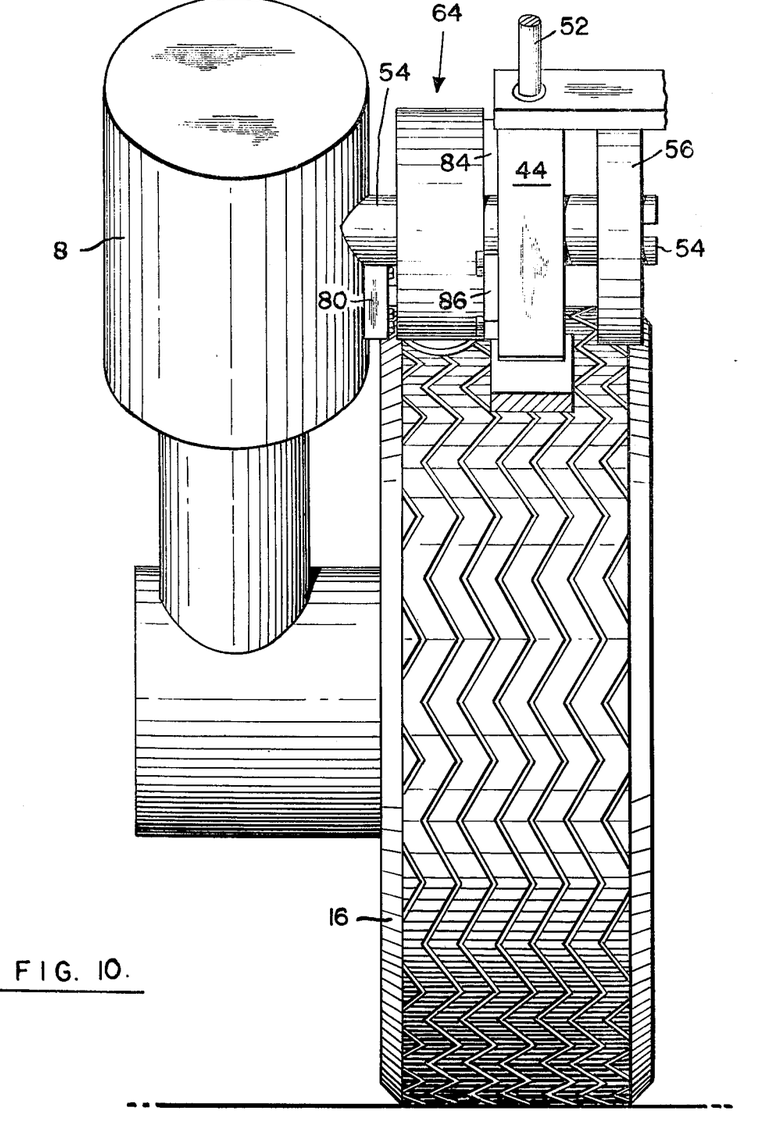
FIG. 10 is a front elevation of the front left-hand motor-wheel system of FIG. 1, showing the pivoted support, the spring, and a damper, and illustrating their relationships to each other.

The manner in which a typical motor-wheel assembly is pivoted for swinging movement about a normally horizontal axis will be best understood from FIGS. 7, 9 and 10. In FIG. 7, a steerable motor-wheel system support member 44 is rotatably mounted in bearings between frame members 46 and 48. Support member 44 is rotated by the tie rod 32 (FIG. 1) through crank 50 and shaft 52. Support 44 is rotatable in its bearings about an axis which is aligned with the axis of shaft 52. A shaft 54, which is viewed end-wise in FIG. 7, is rigidly secured to the motor-wheel system, as shown in FIG. 10, and is rotatable in a bearing in support member 44. It will be observed that the motor-wheel system comprising motor 8 and wheel 16 is capable of swinging in a vertical plane perpendicular to the axis of shaft 54, which is normally horizontal. The axis of steering control shaft 52 is perpendicular to its corresponding wheel axis and is desirably positioned so that it intersects the roadway between the lateral boundaries of the area of contact between the wheel and the roadway. The term "perpendicular", as used herein with reference to lines or axes, denotes a Euclidian right-angle relationship, and does not require that such lines or axes intersect or that they would intersect if extended. Therefore, two lines are "perpendicular" within the meaning of the term as used herein if there can be constructed a third line which is parallel to one of said two lines and which intersects the other line at right angles. The axis of the steering control shaft may intersect the roadway at a point just below the wheel axis, or it can be arranged to intersect the roadway ahead of that point (as shown in FIG. 7) or behind that point depending on whether positive or negative caster is desired. Because shaft 52 is disposed at an oblique angle with respect to the horizontal, steering of support member 44 causes the axis of shaft 54 to move out of its normally horizontal condition to some extent. However, shaft 54 is substantially horizontal when the vehicle is moving straight ahead.

Figure 11:
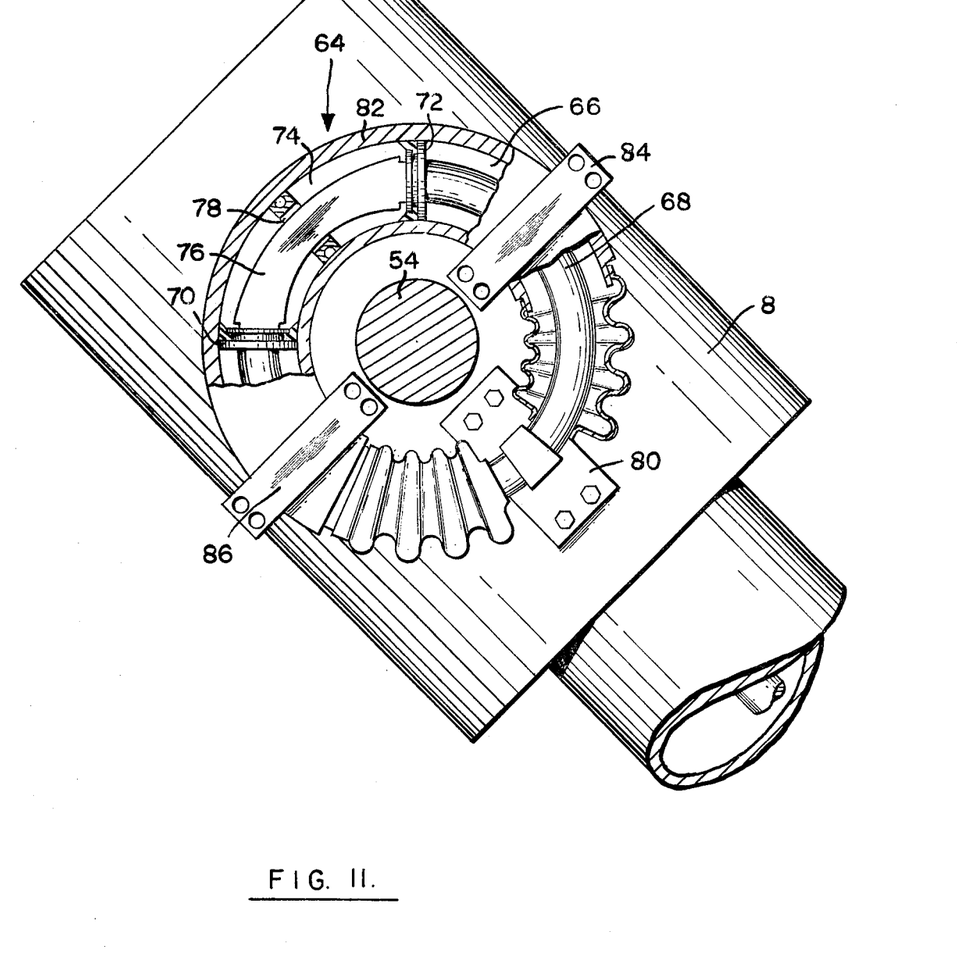
FIG. 11 is a partially cut-away side elevation showing the details of the damper, specifically the damper associated with the front left-hand wheel of FIG. 1.

The motor-wheel system comprising motor 8 and wheel 16 is connected to support member 44 through a spring and a damper connected in parallel. The spring, as shown in FIGS. 9 and 10, is a spiral leaf spring 56. The inner end 58 of spring 56 is received in a slot provided in the end of shaft 54. The outer end 60 of the spring is connected to support member 44 through a motor-driven tension adjusting mechanism indicated generally by 62. The damper 64 is shown in FIGS. 10 and 11. The internal channel 66 of the damper is toroidal in shape. A piston assembly 68, located within channel 66, comprises a pair of sliding seals 70 and 72 which cooperate with the wall of channel 66 to form an enclosed space 74 for containing a hydraulic fluid. A doubly tapered member 76, which is connected between seals 70 and 72, cooperates with a ring-shaped restricting element 78 to restrict the flow of hydraulic fluid from one side of member 78 to the other as piston assembly 68 moves in the channel. Piston assembly 68 is connected to the housing of motor 8 by a bracket 80. The outer member 82 of damper 64 is connected to steerable support member 44 by brackets 84 and 86. Each of the motor-wheel assemblies in the vehicle is provided with a similar spring and damper assembly. In the case of the front wheels, which are steerable, the spring and damper are connected to the steerable support member corresponding to member 44, and are thereby connected to the vehicle frame. In the case of the non-steerable rear wheels, the spring and damper are connected directly to the frame. This damper can be mounted as shown in FIG. 11 or rotated as a whole to a position around axle 54 so that the fluid compartment is normally at the bottom and then clamped as described.

Preferably, the shaft of each motor-wheel system corresponding to shaft 54 (FIG. 7), is positioned so that the center of gravity of the motor approximately coincides with the pivot axis of the system. When the motor-wheel system is pivoted at or very near the center of gravity of the motor, the motor becomes effectively part of the spring-supported mass and contributes little, if anything to the non-spring-supported mass of the vehicle. The result is a reduction of the momentum transferred to the spring-supported mass of the vehicle as a result of a road bump.

In order to prevent the transmission of impulse shock through the motor-wheel systems to the vehicle frame, the normally horizontal pivot axis of each motor-wheel system is chosen so that it approximately coincides with an axis of suspension conjugate to a center of percussion located at the point where the impulse caused by an average road bump acts on the arm of the system. This point will be approximately (though not necessarily exactly) at the location of the wheel axis. The location of the axis of suspension for a given motor-wheel system can be determined from its mass, the location of its center of mass, and its moment of inertia about the center of mass.

Consider the motor-wheel system shown in FIG. 7, and assume, for the purpose of setting up equations, that the system is unconstrained and that no external force is applied. Further assume that the system has a center of mass located at $c_m$, a mass $m$ and a moment of inertia $I_{cm}$ about its center of mass. Assume that a first impulse P is applied to the wheel axis in the direction of the arrow, and that a second impulse $P_o$ is applied to shaft 54. The angular velocity of the system about $c_m$ can be expressed in terms of the two applied impulses by the equation $$\omega = \frac{bP - aP_o}{I_{cm}} \quad (1)$$

where
 b is the distance between the wheel axis and the center of mass; and
 a is the distance between the center of mass and the axis of shaft 54, and is unknown.

The two impulses P and $P_o$ also produce a translational velocity which, measured at the center of mass, is $$v_{cm} = \frac{P_o + P}{m} \quad (2)$$

The assumption that the system is unconstrained is of course a fiction; the system is constrained because shaft 54 is held on a fixed axis by a bearing in support member 44. The center of mass moves in an arc about the fixed axis of shaft 54. $P_o$ can now be thought of as the magnitude of the impulse imparted by shaft 54 to its bearing as a result of the application of impulse P to the wheel axis. Impulse $P_o$ can be in either direction along the arrow labelled $P_o$, depending on parameters of the system. The system can now be thought of as rotating about shaft 54 at the same angular velocity $\omega$ as used in the initial assumption in which rotation of the system was imagined as centered on the center of mass. The instantaneous linear velocity of the center of mass is $$v_{cm} = a\omega \quad (3)$$

substituting (1) and (2) into (3):

$$\frac{P_o + P}{m} = a\left(\frac{bP - aP_o}{I_{cm}}\right) \quad (4)$$

Equation (4) is solved for $P_o$ as follows:

$$\frac{P_o}{m} + \frac{P}{m} = \frac{abP}{I_{cm}} - \frac{a^2 P_o}{I_{cm}} \quad (5)$$

$$\frac{P_o}{m} + \frac{a^2 P_o}{I_{cm}} = \frac{abP}{I_{cm}} - \frac{P}{m} \quad (6)$$

$$P_o(I_{cm} + a^2 m) = P(abm - I_{cm}) \quad (7)$$

$$P_o = \frac{P(abm - I_{cm})}{I_{cm} + a^2 m} \quad (8)$$

For impulse P to produce no resulting impulse acting on support 44 through shaft 54, i.e. for the magnitude of $P_o$ to equal zero, it will be seen from equation (8) that:

$$abm = I_{cm}. \quad (9)$$

Consequently the value of unknown $a$ is:

$$a = \frac{I_{cm}}{bm} \quad (10)$$

Thus, for the magnitude of impulse $P_o$ to be zero, shaft 54 must be located at a distance of $$\frac{I_{cm}}{bm} + b$$

from the wheel axis.

With the axis of shaft 54 positioned in accordance with the above relationship, theoretically, no force is exerted on shaft 54 at the time a bump in the roadway strikes the motor-wheel system through the center of percussion. Therefore the bump cannot be felt. Furthermore most of the energy delivered by the bump is absorbed by the damper in rotation of the motor-wheel system about shaft 54. What energy is left over is transmitted to the frame by shaft 54, the spring and the damper. This energy causes the chassis to translate upward, but the motion will have a smooth gradient rather than an impulse shock. The resulting period of oscillation of the motor-wheel system should, of course, be sufficiently short to allow the motor-wheel system to accommodate a typical bumpy road, or whatever average conditions the vehicle is expected to encounter.

Due to the rearward component of motion of the wheel system, the wheel remains in contact with the bump longer and lowers the magnitude of the force which delivers the impulse. The magnitude of the impulse is the same, but it is spread out over a longer time period. The governing equation is $$mv = \int_0^{\Delta t} F\, dt$$

Increasing the time period Δt requires a smaller force to achieve the same magnitude of impulse, therefore, this also causes the translation to be more gradual, since force is the product of mass and acceleration (F = ma).

It has been pointed out that the motor-wheel system is desirably pivoted at the center of gravity of the motor in order to minimize the transfer of momentum, and that it is also desirable to pivot the system at an axis of suspension having a conjugate center of percussion at the wheel axis in order to eliminate the transfer of impulse shock to the vehicle chassis. Theoretically these two objectives are inconsistent. However, by making the arm structure which connects the motor and wheel light in weight, the center of gravity of the motor and the theoretical axis of suspension of the system can be brought sufficiently close to each other and to the pivot axis, that the benefits of both objectives can be realized simultaneously.

The spring and damper are constructed as illustrated in FIGS. 9, 10 and 11 primarily by reason of the size of the steerable support member 44. With a larger steerable support member, it is entirely possible for conventional springs and dampers to be used, and conventional devices may, of course, be used in conjunction with the unsteered rear wheels.

Figure 2:
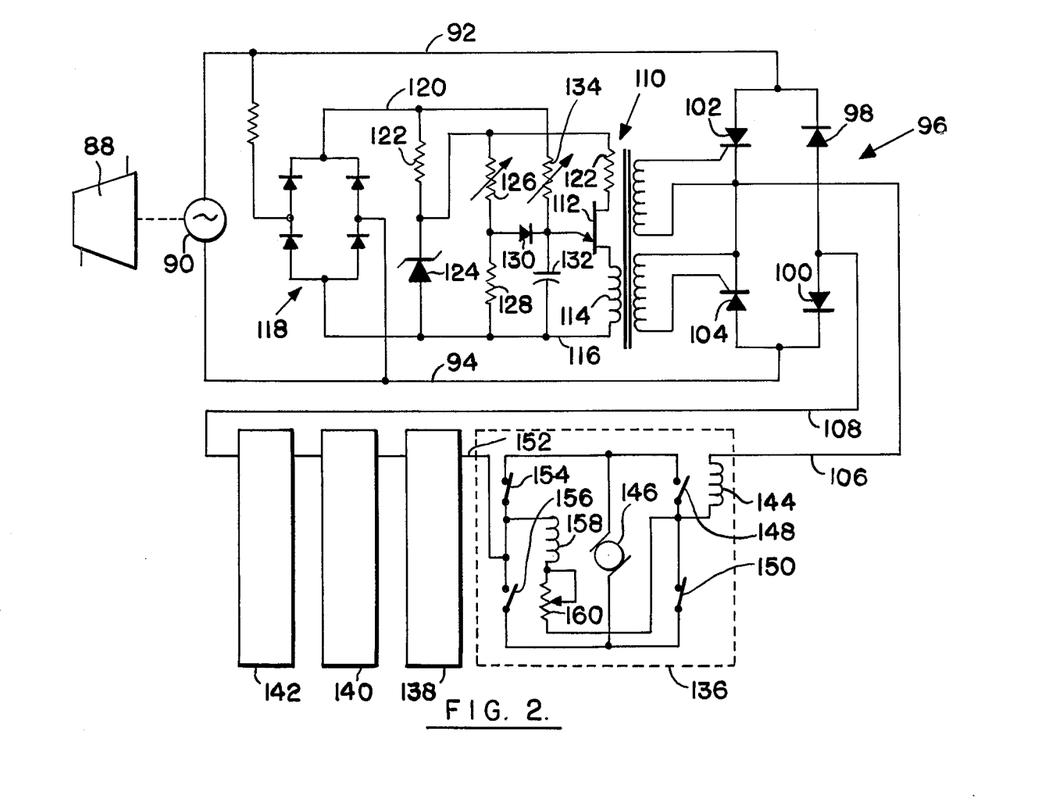
FIG. 2 is an electrical schematic of a power plant and control system suitable for use in operating the independent motor-wheel systems of FIG. 1.
Figure 3:
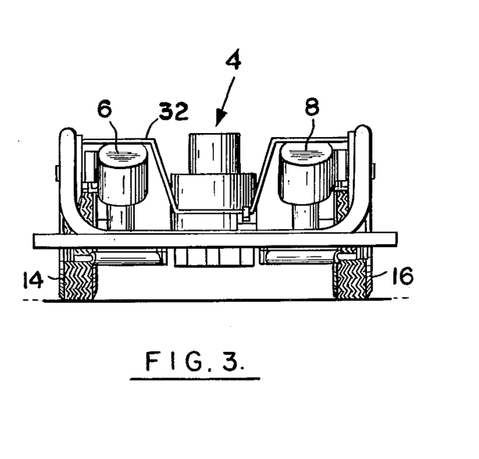
FIGS. 3, 4 and 5 are respectively a front elevation, a top plan view and a left-hand side elevation of the vehicle of FIG. 1.

Electrical power for the motors of the vehicle is produced by a turbine-generator set, indicated in FIG. 1 at 4, and shown schematically in FIG. 2 as comprising gas turbine 88 and alternator 90 connected in driving relationship. The A.C. output of alternator 90 is delivered to lines 92 and 94. The alternating current in lines 92 and 94 is rectified by a bridge 96, which comprises rectifiers 98 and 100, and controlled rectifiers 102 and 104. The D.C. output of the bridge is delivered to positive line 106 and negative line 108. The gates of controlled rectifiers 102 and 104 are triggered by pulses delivered through transformer 110 and generated by a pulse generator comprising unijunction transistor 112, $b_1$ of which is connected through transformer primary 114 to line 116.

Bridge rectifier 118 delivers unfiltered full wave rectified D.C. to lines 116 and 120. The full wave rectified D.C. is connected through resistor 122 and zener diode 124, and the voltage across the zener diode is dropped through variable resistor 126 and fixed resistor 128, and delivered through diode 130 to capacitor 132 and the gate of unijunction transistor 112. The unfiltered full wave rectified D.C. in line 120 is also delivered to capacitor 132 and the gate of unijunction transistor 112 through a second variable resistor 134. $b_2$ of unijunction transistor 112 is connected through resistor 122 to line 120.

Variable resistor 126 acts as the throttle of the vehicle, controlling the charging of capacitor 132, and therefore controlling the timing of the controlled rectifier trigger pulses delivered through transformer 110. The timing of these trigger pulses in turn, controls the average D.C. level in output lines 106 and 108. Resistor 134 is used to preset the response characteristics of the pulse generating circuit.

The output of bridge circuit 96 is connected to the four motors of the vehicle in series. One of the motors together with its associated circuitry is shown in block 136, and the remaining motors are indicated at blocks 138, 140 and 142. Each of the motors is a compound-wound universal motor. In the case of the motor in block 136, a series field winding 144 is connected to positive line 106. The motor armature 146 is connected to the opposite end of winding 144 through a pair of reversing switches 148 and 150 which are mechanically connected to a control lever (not shown) within the vehicle, and arranged to operate so that either one, or the other is closed, but not both. The negative line 152 from block 138 is connected to the armature through reversing switches 154 and 156, which are likewise connected to the control lever, and interconnected with each other and with switches 148 and 150 in such a way as to reverse the polarity in the armature. Negative line 152 is connected to a shunt field winding 158, which is connected in series with variable resistor 160, the opposite end of which is connected to winding 144. The circuitry in each of blocks 138, 140 and 142 is identical to that in block 136.

The resistors corresponding to resistor 160 provide a means for balancing the motors so that each motor exhibits the same stall torque. With each motor stalled, a measured amount of current is applied, and the torque produced by the motor is measured and adjusted to the desired value by adjustment of the resistor corresponding to resistor 160. In this way, all four motors can be closely matched. The fact that all four blocks 136, 138, 140 and 142 are connected in series insures that each motor draws the same current as all of the others.

Where the payload in the vehicle is severely unbalanced, it is necessary to adjust the four motor-wheel systems so that they are all disposed at the requisite angle to the road and chassis. The adjustment is preferably accomplished by means of a motor-driven tension adjusting mechanism associated with each motor-wheel system and corresponding to mechanism 62 in FIG. 9. The tension adjusting mechanism comprises a motor 162 arranged to drive a screw 164 through right-angle gearing comprising a worm 166 and a wheel 168. Screw 164 is threaded into a nut 170 which is secured to outer end 60 of spring 56. Motor 162 is a reversible motor, and operation in one direction increases the tension on spring 56, while operation in the other direction decreases the tension on the spring. Microswitches 172 and 174, secured to steering support member 44 are arranged to be actuated by arm 176, which is secured to shaft 54 through spring 178. The arrangement of the microswitches is such that either one or the other is actuated by arm 176 except when the motor-wheel system is within a very limited range of positions in its range of rotation about the axis of shaft 54.

Figure 8:
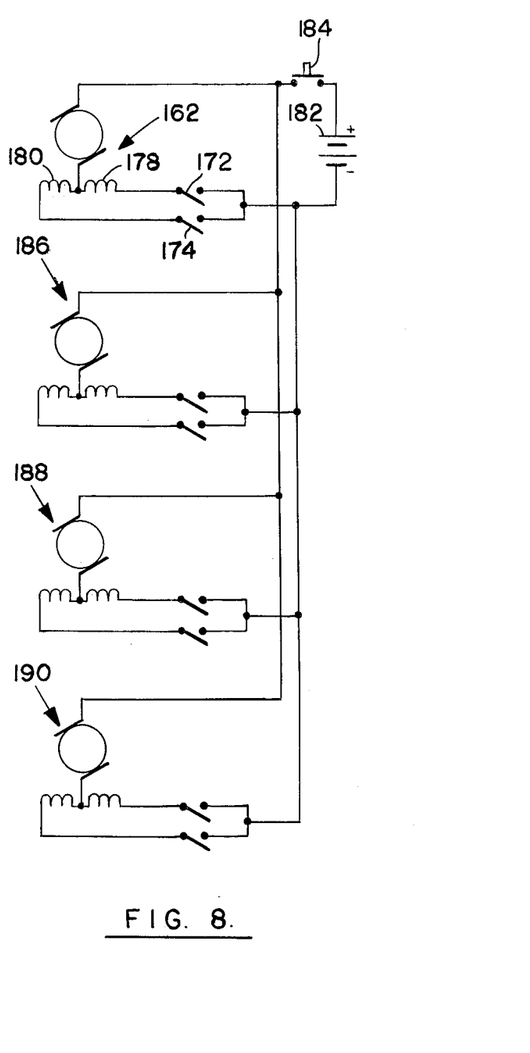
FIG. 8 is an electrical schematic of a motor-operated levelling system used in the vehicle of FIG. 1.

Each of the four motor-wheel systems is provided with a similar tension-adjusting means. The electrical circuitry for all four systems is shown in FIG. 8. Motor 162 is provided with two series-connected field windings 178 and 180. Field winding 178 is connected to a battery 182 through microswitch 172, and winding 180 is connected to the battery through microswitch 174. The opposite side of the battery is connected through a control push button 184 to the motor armature. Each of three additional tension-adjusting means 186, 188 and 190 is similarly connected to the battery through push button 184.

The microswitches in each tension adjusting means are connected to the appropriate field windings in such a way as to rotate the motor in a direction such that the corresponding motor-wheel system moves toward the desired angle. When the motor-wheel system reaches the desired angle, both microswitches open, and the motor stops. In operation, whenever it appears that the load in the vehicle is causing a serious imbalance, push button 184 is despressed, and whichever of the four motor-wheel systems require adjustment are automatically adjusted.

A modification of the invention having steerable rear wheels as well as steerable front wheels, is illustrated in FIGS. 12 – 17.

Figure 12:
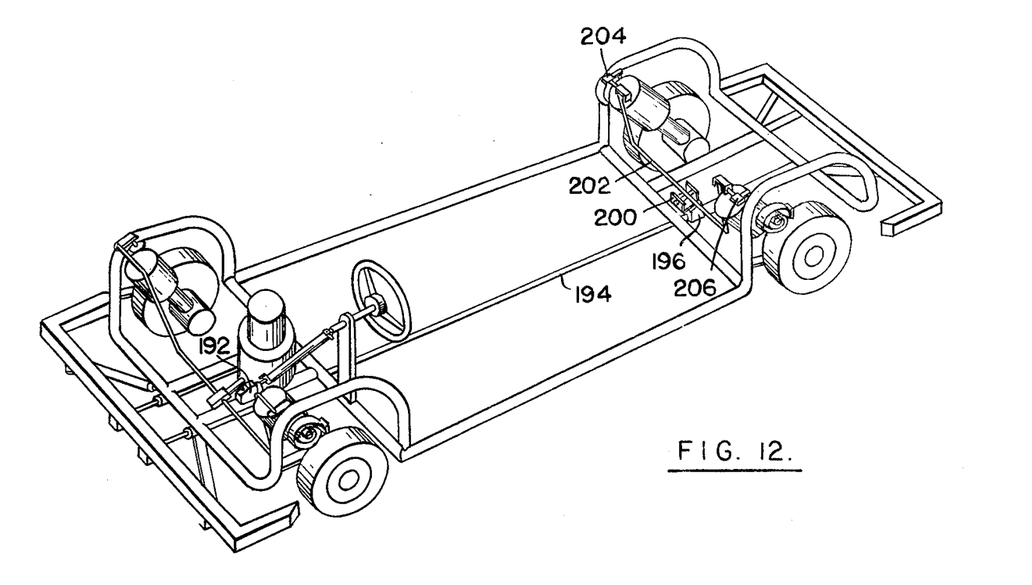
FIG. 12 is an oblique perspective of a modified vehicle having steerable rear wheels.
Figure 14:
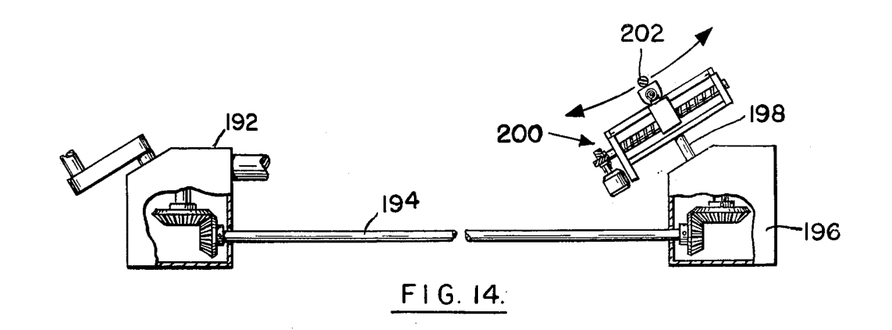
FIG. 14 is a partially cut-away elevation of the front and rear steering boxes of FIG. 12, showing the interconnecting shaft and gearing.

The front steering system of the modified vehicle is substantially the same as that of the vehicle of FIG. 1, except that steering box 192 (FIG. 12) is mechanically interconnected, through shaft 194, to a rear steering box 196. Right-angle gearing through which interconnecting shaft 194 operates, is shown in FIG. 14. Output shaft 198 of rear steering box 196 supports a selector assembly 200, which is adapted to move rear tie rod 202 across the axis of steering box output shaft 198 by means of a motor-controlled screw. As shown in FIG. 12, the tie rod is pivotally attached to the steering cranks 204 and 206 in order to permit the swinging movement imparted to it by selector assembly 200.

Figure 15:
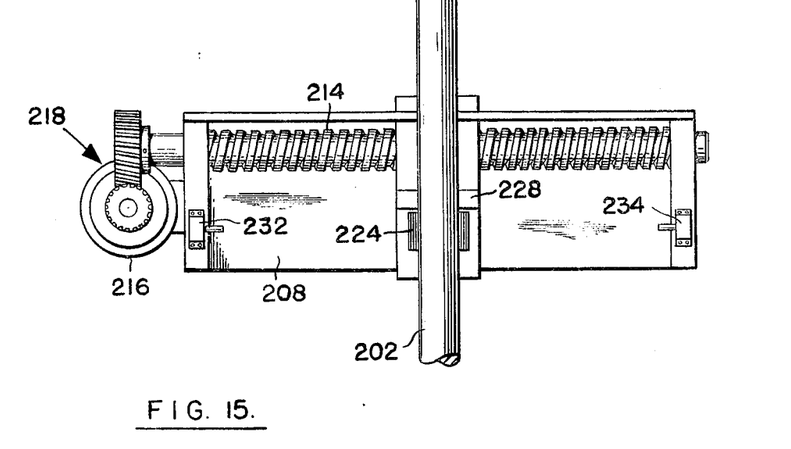
FIGS. 15, 16 and 17 are respectively, a top plan view, a right-hand side elevation and a front elevation of the rear steering selector.
Figure 16:
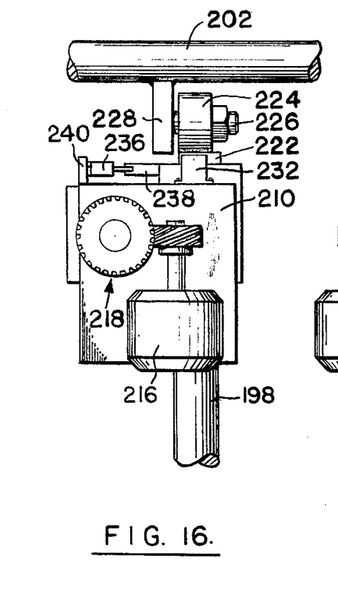
Figure 17:
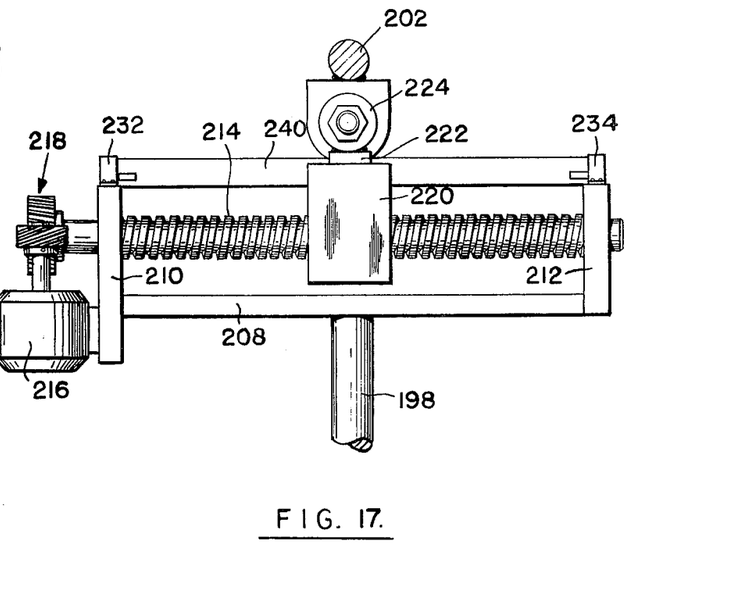

FIGS. 15, 16 and 17 show the selector assembly in detail. The selector assembly comprises a plate 208, having a pair of uprights 210 and 212 attached to it at opposite ends. Plate 208 is secured to steering box output shaft 198, and a screw 214 is rotatably supported between the plates in perpendicular relationship to the axis of output shaft 198. Screw 214 is driven by electric motor 216 through right angle helical gearing 218.

A carriage 220 rides on screw 214, and is positioned thereby. A cylindrical pin 222 is held in a conforming cylindrical hole (not shown) in the carriage, and is vertically movable and rotatable therein. A bearing 224 is secured to the top of pin 222. A shaft 226, extending in parallel to the axis of tie rod 202, is secured to tie rod 202 by bracket 228. Shaft 226 is rotatable in bearing 224. The combination of slidable and rotatable pin 222 and bearing 224 permits the carriage to move the tie rod through the arcuate path depicted by the arrows in FIG. 14. It also allows the tie rod to remain in the same orientation while the steering box output shaft 198 rotates.

The mechanism shown in FIGS. 15, 16 and 17, provides for three selectable steering modes. In one such mode, the position of the carriage is such that the axis of shaft 198 intersects the axis of tie rod 202, as shown in FIG. 17. In this mode, rotation of shaft 198 does not effect steering of the rear wheels. If the carriage is moved to one end of the screw, a second steering mode takes place, in which rotation of steering box output shaft 198 causes the rear wheels to steer in the same direction as the front wheels. In a third steering mode, the carriage is at the opposite end of the screw, and rotation of the steering box output shaft causes the rear wheels to steer in the direction opposite to the direction in which the front wheels are steered.

Control of the rotation of screw 214 by motor 216 is effected by a circuit including microswitches 232 and 234 and toggle switch 236 (FIG. 16). The microswitches are normally closed microswitches arranged to be actuated to their open condition by the body of the carriage, when the carriage reaches the ends of the screw. As shown in FIG. 16, switch 236 is a toggle switch arranged to be actuated by an actuator bar 238, which extends outwardly from the carriage. The toggle switch is centrally located on a bracket 240, and is a single pole, double-throw switch, which is moved to one of its two positions, where it remains, as the carriage passes it in one direction, and is moved to the other of its two positions, where it remains, as the carriage passes it in the opposite direction. The actuator of the toggle switch is made from a suitable spring material to allow the passage of actuating bar 238.

Figure 13:
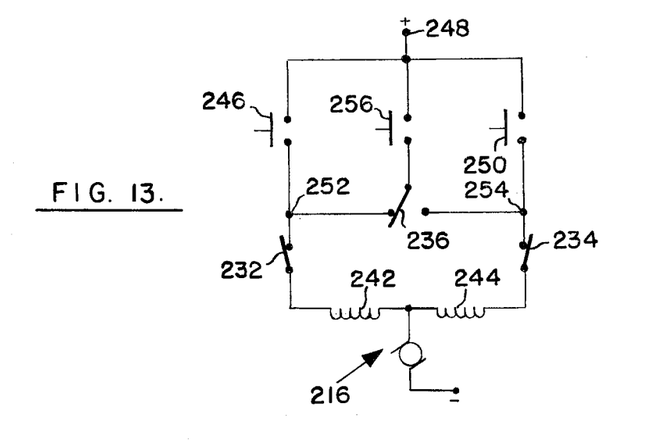
FIG. 13 is an electrical schematic of a selector device for selecting the manner in which the rear wheel steering system of FIG. 12 responds to the steering wheel.

The electrical circuitry for the selector mechanism is illustrated in FIG. 13. Motor 216 has a pair of series-connected field windings 242 and 244, winding 242 being arranged for forward operation of motor 216, and winding 244 being arranged for reverse operation. Winding 242 is connected through normally closed microswitch 232, and through normally open push button 246, to supply terminal 248. Reversing winding 244 is similarly connected through normally closed microswitch 234 and normally open push button 250 to supply terminal 248. The fixed contacts of toggle switch 236 are respectively connected to junction 252, between switch 232 and push button 246, and to junction 254, between switch 234 and push button 250. The movable contact of toggle switch 236 is connected through push button 256 to supply terminal 248.

When push button 246 is closed, and the carriage has not already actuated microswitch 232, winding 242 is activated, and the motor drives the screw in a direction so that the carriage approaches switch 232. When switch 232 is actuated, the motor stops, and the carriage remains in that position until one or the other of push buttons 250 and 256 are actuated.

Actuation of push button 250, with microswitch 234 in its normally closed condition energizes reversing winding 244, and causes the carriage to approach and ultimately open switch 234.

It should be noted that the condition of switch 236 is dependent upon the position of the carriage. Thus, if the carriage has passed switch 236 in the direction toward switch 234, switch 236 will be in the position illustrated in FIG. 13. Likewise, if the carriage has passed switch 236 in the direction of switch 232, switch 236 will be in the condition opposite that shown. If the carriage is in contact with switch 234, so that switch 234 is open, and push button 256 is actuated, winding 242 is energized, and the carriage moves until toggle switch 236 is actuated. Since toggle switch 236 is centrally located on the selector mechanism, it is actuated when tie rod 202 is aligned with the axis of steering box output shaft 198. Actuation of toggle switch 236 causes the carriage to stop in this position. If the carriage is at the opposite end of its travel, the circuit of FIG. 13 operates in a similar manner to effect movement of the carriage to its central position when push button 256 is actuated.

I claim:
1. A self-propelled land vehicle comprising:
a frame;
a power source supported on said frame;
a plurality of wheels arranged to support said frame from a roadway and to propel said frame by rotation of said wheels;
each of said wheels having its own motor associated with it in driving relationship thereby forming a plurality of indpendent motor-wheel systems;
controllable means for connecting each said motor to said power source for delivery of driving power to each said motor;
each of said motor-wheel systems including an arm pivotally supported on said frame, and adapted to swing about a normally horizontal axis, the wheel of each motor-wheel system being for rotation about an axis of rotation supported at an end of the arm of said system remote from said normally horizontal axis, and the motor of each motor-wheel system also being supported on the arm of said system, the axis of rotation of the wheel being rigidly connected to the motor housing through said arm whereby the housing of the motor is caused to move in response to swinging movements of the wheel axis about said normally horizontal axis, and said motor being at a location closer to said normally horizontal axis than the axis of rotation of the wheel of said system is to said normally horizontal axis, said location being such that the center of gravity of the motor approximately coincides with said normally horizontal axis;

means for maintaining said motor-wheel systems in a position such that a straight line extending perpendicularly between the normally horizontal axis of each system and the corresponding wheel axis, forms an acute angle with the roadway; and spring means and damping means associated with each of said motor-wheel systems, and acting on the arm thereof.

2. A vehicle according to claim 1 in which the wheel, motor, and other parts of each of said motor-wheel systems are so positioned in accordance with their respective masses that the said normally horizontal axis of the system is approximately an axis of suspension for a conjugate center of percussion located substantially at the corresponding wheel axis.

3. A vehicle according to claim 1 in which said means for maintaining said motor-wheel system in a position comprises means for adjusting the tension or compression on the spring means associated therewith.

4. A vehicle according to claim 1 having at least two of said motor-wheel systems, and means for simultaneously steering both of said two systems by rotating each system about an inclined steering axis which is fixed with respect to the vehicle frame, and which is perpendicular to the wheel axis and intersects the roadway between the lateral boundaries of the area of contact between the wheel and the roadway when the said normally horizontal axis of the system is horizontal, the steering force being transmitted to each of said two systems through the normally horizontal axis thereof.

5. A vehicle according to claim 1 including means for steering at least one of said motor-wheel systems about an inclined steering axis which is fixed with respect to the vehicle frame, and which is perpendicular to the wheel axis of said system and intersects the roadway between the lateral boundaries of the area of contact between the wheel and the roadway when its said normally horizontal axis is horizontal, said steering means comprising support means providing a pivot for pivotally supporting the arm of said one motor-wheel system for rotation about a normally horizontal axis, means for pivotally mounting said support means on said frame for rotation about said steering axis, whereby said one motor-wheel system is supported on said frame through said pivotally mounted support means.

6. A vehicle according to claim 5 in which the spring means and damping means, associated with said one motor-wheel system, are connected in parallel between the arm of said one motor-wheel system and said pivotally mounted support means.

7. A vehicle according to claim 6 in which the means for maintaining said one motor-wheel system in a position comprises means for adjusting the tension or compression on the spring means associated therewith.

8. A vehicle according to claim 6 in which the means for maintaining said one motor-wheel system in a position comprises electric motor means for adjusting the tension or compression on the spring means associated therewith.

9. A vehicle according to claim 1 wherein at least two of said independent motor-wheel systems are arranged on said frame one behind the other to provide a front and rear wheel, and comprising means for steering one of said two systems, means responsive to said steering means for steering the other of said two systems, and selectable means for establishing a first selectable relationship between said steering means and said other of said two systems, in which operation of said steering means effects steering of said two systems in the same direction and establishing a second selectable relationship between said steering means and said other of said two systems in which operation of said steering means effects steering of said one of said two systems but does not effect steering of said other of said systems.

10. A vehicle according to claim 1 wherein at least two of said independent motor-wheel systems are arranged on said frame one behind the other to provide a front and rear wheel, and comprising means for steering one of said two systems, means responsive to said steering means for steering the other of said two systems, and selectable means for establishing a first selectable relationship between said steering means and said other of said two systems, in which operation of said steering means effects steering of said two systems in the opposite direction and establishing a second selectable relationship between said steering means and said other of said two systems in which operation of said steering means effects steering of said one of said two systems but does not effect steering of said other of said systems.

11. A vehicle according to claim 10 in which said selectable means includes means for establishing a third selectable relationship between said steering means and said other of said two systems, in which operation of said steering means effects steering of said two systems in the same direction.

12. A self-propelled land vehicle comprising:
a frame;
a power source supported on said frame;
a plurality of wheels arranged to support said frame from a roadway and to propel said frame by rotation of said wheels;
each of said wheels having its own motor associated with it in driving relationship thereby forming a plurality of independent motor-wheel systems;
controllable means for connecting each said motor to said power source for delivery of driving power to each said motor;
each of said motor-wheel systems including an arm pivotally supported on said frame, and adapted to swing about a normally horizontal axis, the wheel of each motor-wheel system being rotatably supported at an end of the arm of said system remote from said normally horizontal axis, and the motor of each motor-wheel system being supported on the arm of said system at a location closer to said normally horizontal axis than the axis of rotation of the wheel of said system is to said normally horizontal axis;

central location thereon between said seals, whereby said restriction-providing means provides a greater restriction near the ends of piston travel than at intermediate positions of piston travel.

16. A vehicle according to claim 1 adapted for movement primarily in one direction, in which the arms of said motor-wheel systems are disposed so that upward movement of the wheel of each system, as the result of its striking a bump in the roadway, is accompanied by a component of motion of the wheel in the direction opposite the primary direction of movement of the vehicle, whereby the impulse imparted to the wheel by the bump results in a shock acceleration of reduced magnitude acting on the vehicle.

* * * * *

UNITED STATES PATENT AND TRADEMARK OFFICE
CERTIFICATE OF CORRECTION

PATENT NO. : 4,089,384
DATED : May 16, 1978
INVENTOR(S) : Gustave Ehrenberg

It is certified that error appears in the above-identified patent and that said Letters Patent are hereby corrected as shown below:

[57] Abstract, line 5, after the word "axis" and before the word "of" insert --and disposed at an acute angle with respect to the roadway, and by positioning the motor on the arm so that the wheel, arm, and motor form a swinging mechanical system, pivoted approximately at the center--.

Column 1, lines 47-53, the equation should read as follows:

$$\frac{\frac{1}{2} m_1 v_1^2}{\frac{1}{2} m_2 v_2^2} = \frac{m_2}{m_1}$$

Column 3, line 53, delete the second occurrence of "the".
Column 9, line 5, "despressed" should be --depressed--.
Column 11, line 1, after "being" insert --supported--.
Column 11, line 2, after "rotation" delete --supported--.

Signed and Sealed this

Thirty-first Day of October 1978

[SEAL]

Attest:

RUTH C. MASON
Attesting Officer

DONALD W. BANNER
Commissioner of Patents and Trademarks